United States Patent [19]
Underwood

[11] Patent Number: 5,282,771
[45] Date of Patent: Feb. 1, 1994

[54] COMBINE SIEVE LEVELLING APPARATUS

[75] Inventor: Mark R. Underwood, Burr Oak, Kans.

[73] Assignee: Probe Adventures, Inc., Burr Oak, Kans.

[21] Appl. No.: 890,716

[22] Filed: May 29, 1992

[51] Int. Cl.$^5$ .............................................. A01F 12/32
[52] U.S. Cl. ............................................ 460/8; 460/9; 460/95; 460/901
[58] Field of Search ............ 460/8, 9, 10, 94, 95, 460/96, 147, 91, 901, 902, 903

[56] References Cited

U.S. PATENT DOCUMENTS

| | | |
|---|---|---|
| 2,382,965 | 8/1945 | Appel . |
| 2,617,518 | 11/1952 | Anderson . |
| 2,656,194 | 10/1953 | Saulsbury . |
| 2,675,809 | 4/1954 | Aber . |
| 3,092,116 | 6/1963 | Stroburg et al. . |
| 3,108,064 | 10/1963 | Grant . |
| 3,186,548 | 6/1965 | Stroburg et al. . |
| 3,367,496 | 2/1968 | Cockle et al. . |
| 3,497,229 | 2/1970 | Sietmann et al. . |
| 3,581,746 | 6/1971 | Looks . |
| 4,535,788 | 8/1985 | Rowland-Hill et al. ............. 56/209 |
| 4,548,214 | 10/1985 | Sheehan et al. ..................... 56/209 |
| 4,557,276 | 12/1985 | Hyman et al. ......................... 460/9 |
| 4,573,483 | 3/1986 | Raineri . |
| 4,897,071 | 1/1990 | Desnijder et al. .................... 460/10 |
| 4,968,284 | 11/1990 | Klimmer et al. ...................... 460/8 |
| 4,968,285 | 11/1990 | Schuhmacher ....................... 460/97 |
| 5,041,059 | 8/1991 | Ricketts et al. .................. 460/902 X |

Primary Examiner—Terry Lee Melius
Attorney, Agent, or Firm—James E. Bradley

[57] ABSTRACT

A sieve for a grain combine has a plurality of longitudinal sections. Each section is pivotally mounted in a sieve frame. A sensing means senses if the combine is leaning to one side. The sensing means controls a drive and linkage mechanism for pivoting each of the sections relative to the sieve frame to maintain each section generally horizontal. Elastomeric seals extend between each of the sections.

13 Claims, 4 Drawing Sheets

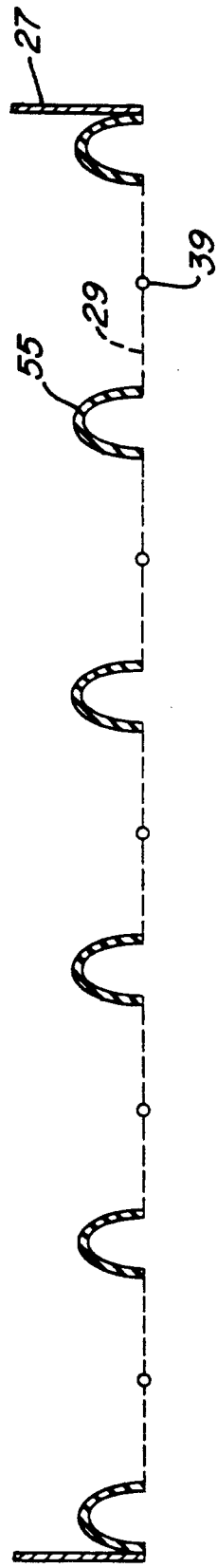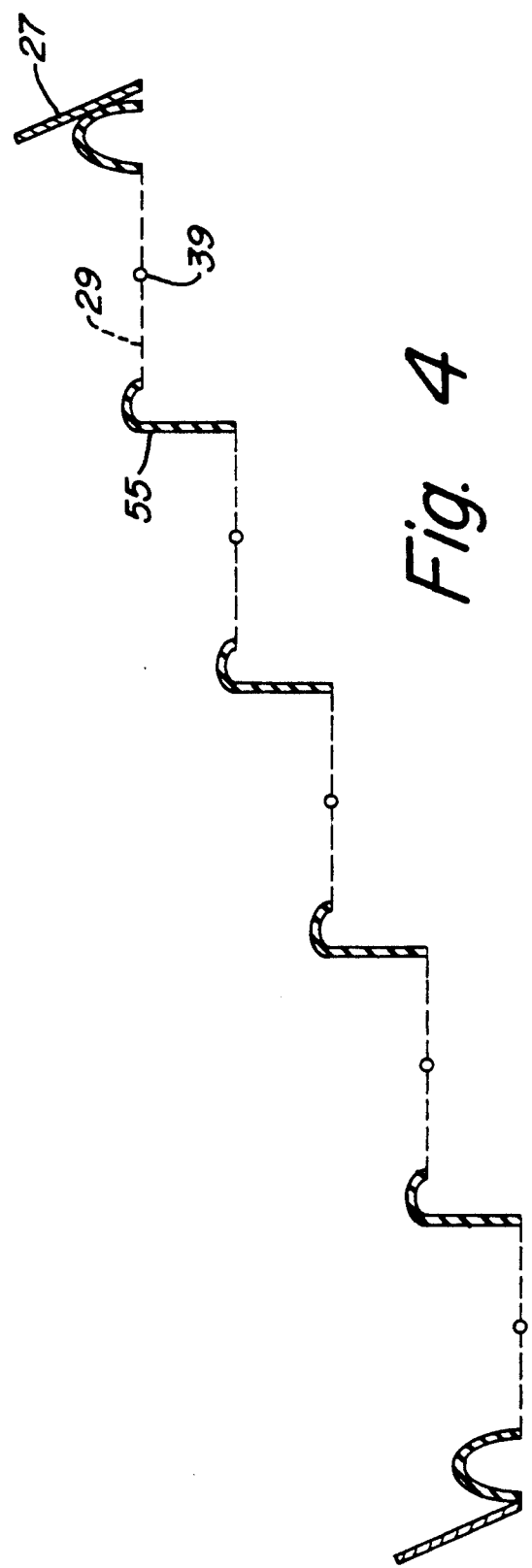

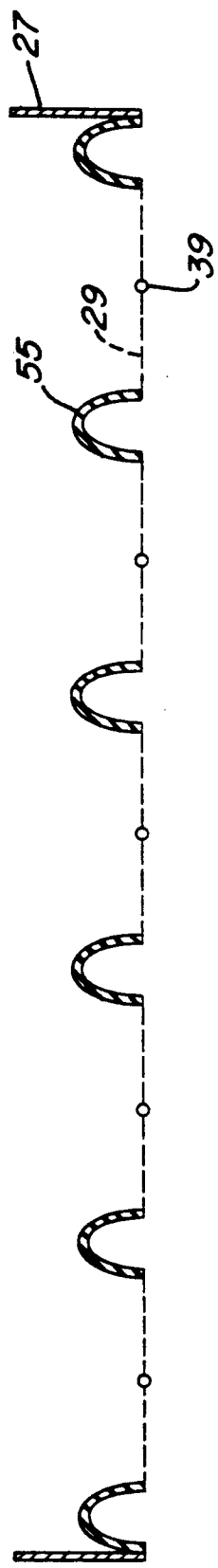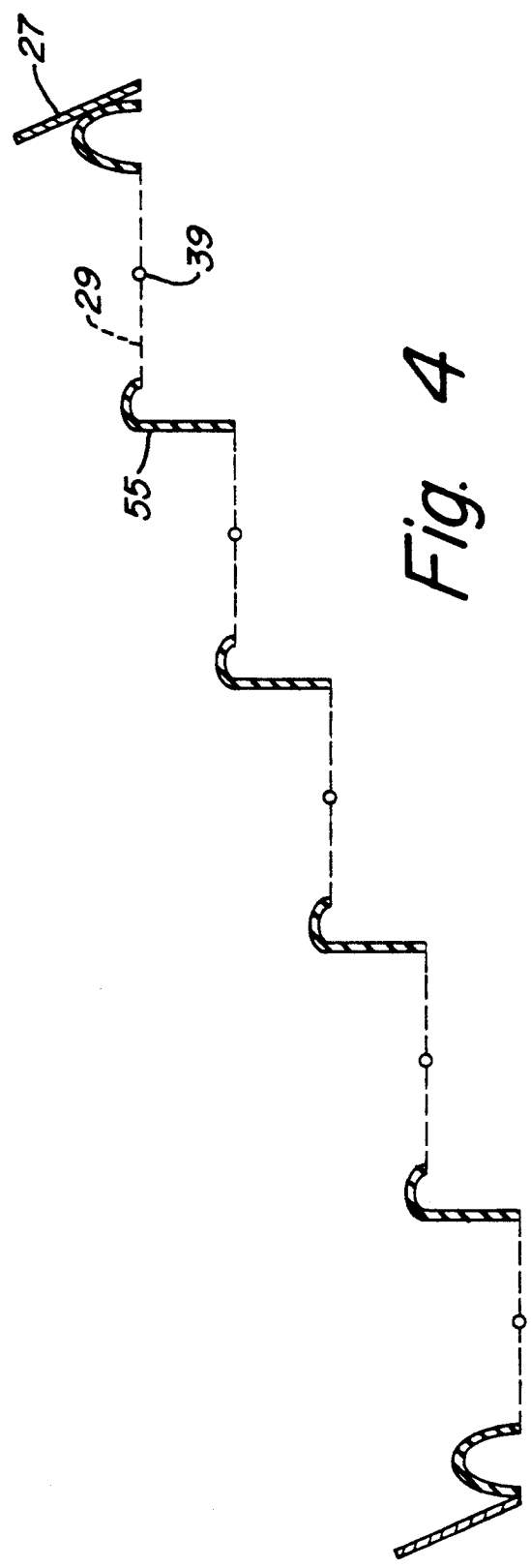

COMBINE SIEVE LEVELLING APPARATUS

BACKGROUND OF THE INVENTION

1. Field of the Invention

This invention relates in general to combines for harvesting grain, and in particular to an apparatus for maintaining the sieve of the combine in a level position while the combine is leaning sideways on a hillside.

2. Description of the Prior Art

Combines of the type concerned herein are large, self-propelled vehicles for cutting and threshing grain. A combine has a header which has a blade that will cut the crop. An auger mounted to the header delivers the crop up into a threshing chamber. The threshed grain falls onto a set of upper and lower sieves. The sieves are oscillated in longitudinal directions and have a large number of fingers. Air blows upward through the sieves. The sieves separate the grain from the chaff, with the grain falling through slots between the fingers into a collection area for transport upward to a bin. The chaff will be blown from the combine.

A combine works best while it is level. The grain will be evenly distributed across the sieves while the sieves are level. However, a large percentage of the tillable acreage in the United States has hillside grades and terraces. Often it is necessary to cut the hillsides and terraces in back and forth sweeps, with the combine leaning laterally. When the combine leans, grain will be distributed onto the sieves unequally. The grain will pile up on certain portions of the sieves. This reduces the effectiveness of the separation between the chaff and the threshed grain.

Hillside combines are available. These combines have complex levelling mechanisms that level the entire combine relative to the header. While workable, levelling the entire combine is expensive. Another approach to preventing uneven distribution of grain on the sieves is to place longitudinal dividers in the grain distributing pan that distributes the grain onto the sieves. Still, grain can pile up on one side. Also, mechanisms to level the grain distributing pan or to level the sieves relative to the rest of the combine have been proposed in the patented art.

SUMMARY OF THE INVENTION

In this invention, at least the upper sieve will employ a levelling mechanism. The levelling mechanism divides the sieve into a number of separate longitudinal sections. Each section will be only a few inches wide and will extend the length of the sieve. Each section mounts to the overall frame of the sieve by a pivot pin. The pivot pin enables each section to pivot about a pivot axis that is parallel to the longitudinal axis of the combine.

The apparatus includes means for sensing the lateral inclination of the combine. The sensor controls an electric motor, which through linkage members, will pivot all of the sections simultaneously when the sieve frame inclines laterally. While leaning, the sieve will have a stair-step configuration.

Also, the fingers of the sieves mount pivotally to the section frames. The fingers can be adjusted simultaneously in each section to various inclinations. This adjusting mechanism comprises a longitudinal drive member that extends along the side of each section frame member. A linkage mechanism will cause longitudinal motion of the drive member to pivot the fingers about the finger axis.

BRIEF DESCRIPTION OF THE DRAWINGS

FIG. 3 is a schematic sectional view illustrating the sieve of FIG. 2, shown in a position while the combine is level in a lateral direction.

FIG. 4 is a schematic view illustrating the sieve of FIG. 2 while the combine is leaning laterally.

FIG. 5 is a sectional view illustrating a portion of the sieve of FIG. 2 taken along the line 5—5 of FIG. 2.

FIG. 6 is a sectional view of a portion of the sieve of FIG. 2, taken along the line 6—6 of FIG. 2.

FIG. 7 is a side view of a portion of one of the sections of the sieve of FIG. 2, taken along the view line 7—7 of FIG. 6.

DETAILED DESCRIPTION OF THE INVENTION

Figure 1:
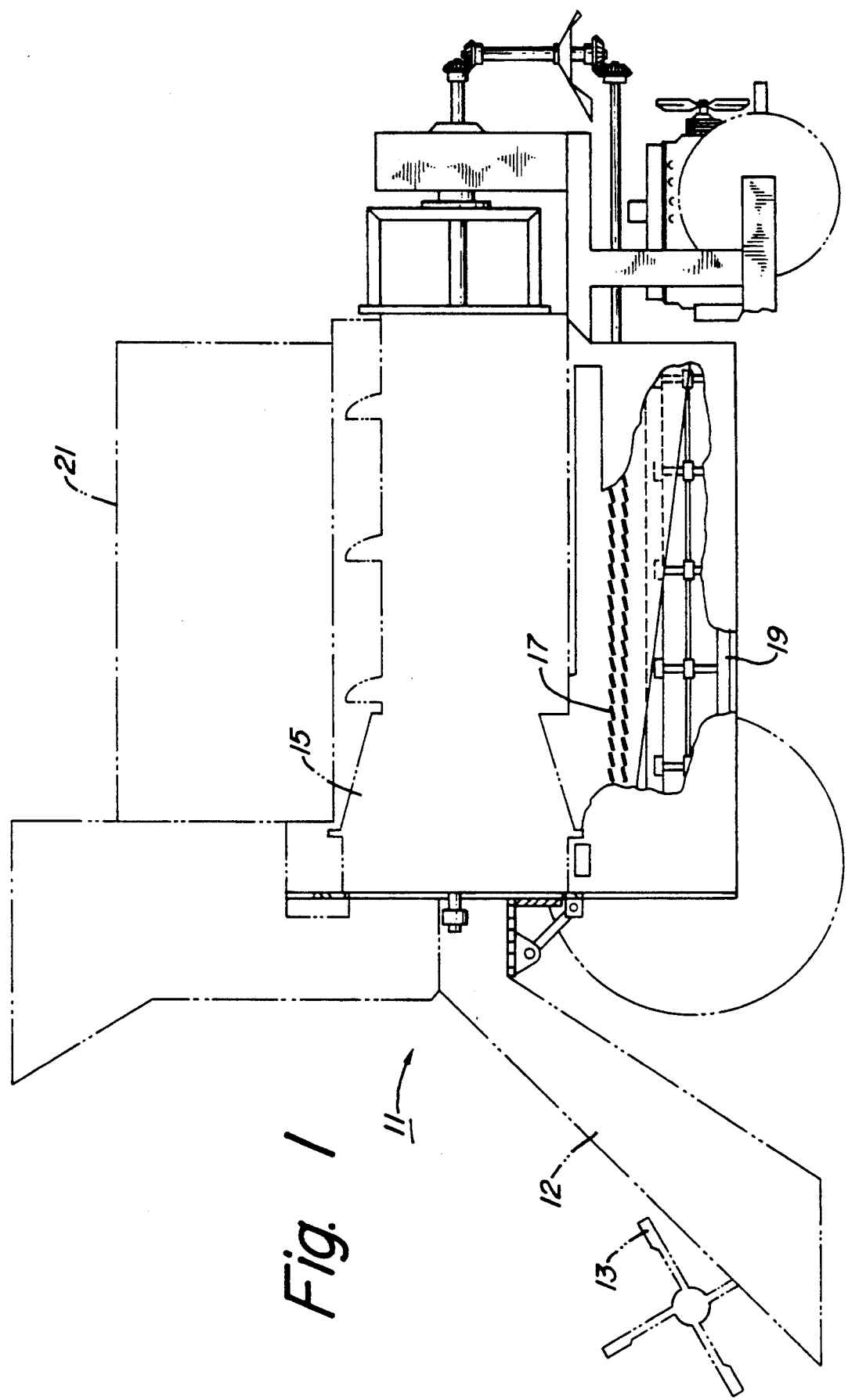
FIG. 1 is a schematic view illustrating a combine having a sieve constructed in accordance with this invention, but shown schematically.

Referring to FIG. 1, combine 11 has a header 12. Header 12 has a blade (not shown) that will cut the crop, which is pushed inward by a rotating reel 13. An auger (not shown) delivers the crop into a threshing rotor 15. Threshing rotor 15 will thresh the grain, with the grain along with some chaff, being delivered downward to upper and lower sieves 17. Sieves 17 are oscillated in longitudinal directions approximately 270 times per minute. The reciprocation is about 1½ inch in a longitudinal direction for each oscillation.

A blower 19 located below sieves 17 distributes air upward through sieves 17. Grain will fall through sieves 17 into a collecting area where it will be delivered upward to a storage bin 21. Chaff will not fall through the sieves 17, rather will be discharged out the combine 11.

Figure 2:
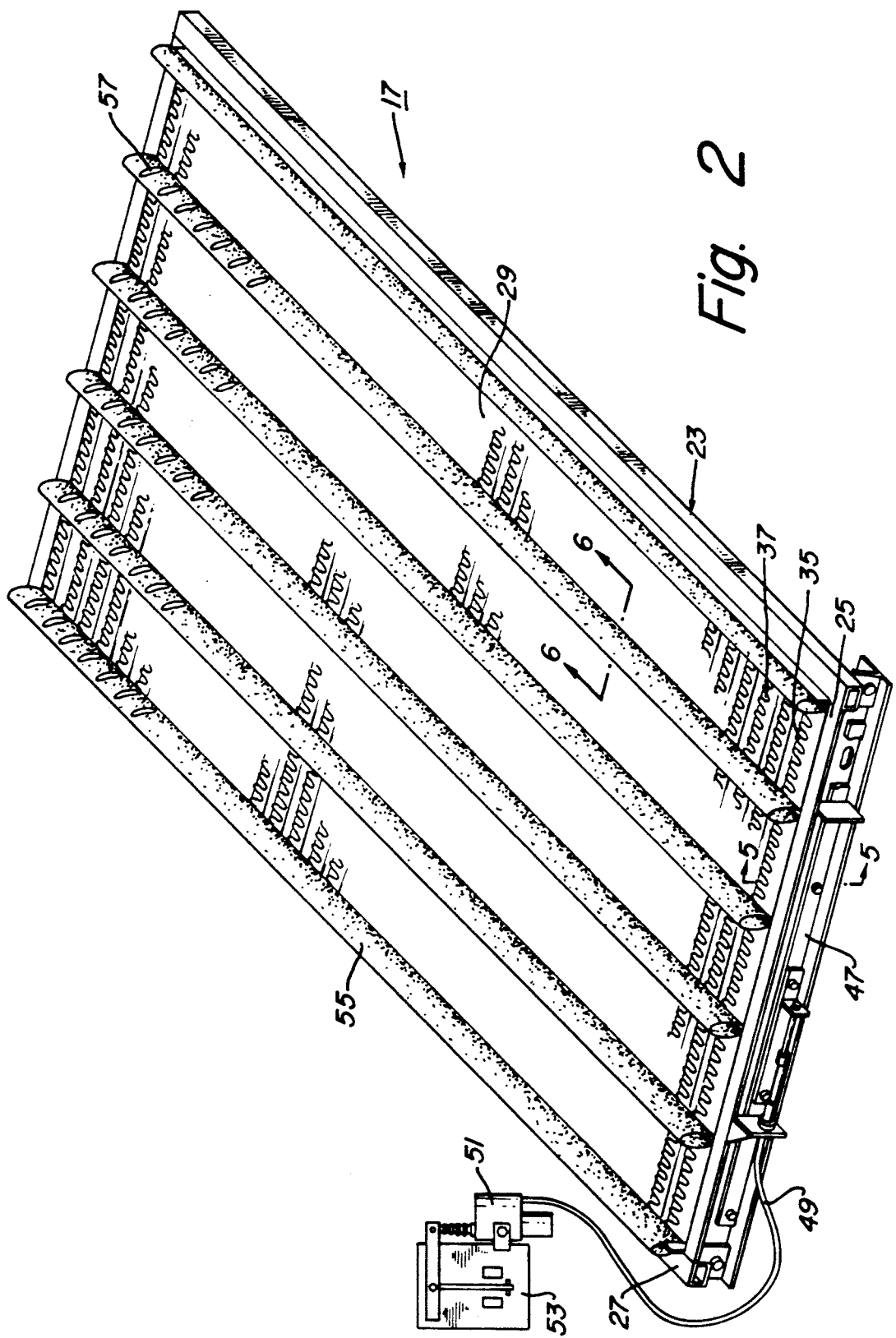
FIG. 2 is a perspective view of the upper sieve of the combine of FIG. 1.

In the preferred embodiment, only the upper sieve 17 has a levelling mechanism, however, the lower sieve 17 could also have a similar levelling mechanism. Referring to FIG. 2, upper sieve 17 is shown removed from combine Sieve 17 has a rectangular sieve frame 23. Sieve frame 23 includes lateral frame members 25 at the forward and rearward ends of sieve frame 23. Longitudinal frame members 27 connect the lateral frame members 25. Longitudinal frame members 27 extend parallel with the longitudinal axis of combine 11. Sieve frame 23 mounts to a conventional oscillating mechanism (not shown) which oscillates sieve frame 23 relative to combine 11. Sieve frame 23 is not capable of tilting about the longitudinal axis relative to combine 11. If combine 11 leans laterally to one side, sieve frame 23 will also lean the same degree.

A plurality of sieve sections 29 (five shown) mount pivotally to sieve frame 23. Each sieve section 29 is rectangular, extending the full length of sieve frame 23 and being a few inches in width. Referring also to FIGS. 5 and 6, each sieve section 29 has a rectangular frame, including two longitudinal section members 31, interconnected at the forward and rearward ends by lateral section members 33.

A plurality of fingers 35 mount to each sieve section 29. Each finger 35 is a generally flat plate extending the width of each sieve section 29. A plurality of slots 37 extend longitudinally partially through each finger 35, dividing each finger 35 into a number of finger-like protrusions, between which threshed grain may pass.

Sieve sections 29 are mounted pivotally to sieve frame 23 by pivot pins 39. Each pivot pin 39 is located on an axis that is parallel to the longitudinal axis of sieve frame 23. Each pivot pin 39 extends from one of the lateral section members 33 rotatably through a hole in the sieve frame lateral frame member 25. FIGS. 3 and 4 illustrate the tilting movement of each sieve section 29 about pivot pins 39.

Referring to FIG. 5, a linkage member 41 is rigidly secured to the lateral section member 33 below pivot pin 39. Linkage member 41 is a bracket that extends downward below lateral section member 33. A bolt 43 mounts to the lower end of linkage member 41 and extends through an elongated slot 45 in lateral frame member 25. A drive member 47, also shown in FIG. 2, extends along the lateral frame member 25. Drive member 47 will move back and forth relative to lateral frame member 25. This movement moves bolt 43 back and forth along elongated slot 45. This causes each linkage member 41 to pivot or rotate lateral section member 33 and the entire sieve section 29 about pivot pin 39.

A cable 49 connects to an electric motor 51 for moving drive member 47 when combine changes its lateral or leaning inclination. An inclinometer 53 of a conventional design senses the leaning of combine 11 and provides a signal to electric motor 51 to move drive member 47.

Referring again to FIGS. 2 and 6, a longitudinal elastomeric seal 55 extends between each of the sieve sections 29. Seal 55 is generally an inverted U-shaped member. It has a lower edge of one leg secured to an upper edge of the longitudinal section member 31 of one sieve section 29. The other leg secures to the upper edge of the adjacent longitudinal section member 31 of an adjacent sieve section 29. Seal 55 prevents grain and chaff from falling between the sections 29. Seal 55 also accommodates the levelling movement, as illustrated in FIGS. 3 and 4.

As shown in FIG. 2, preferably a plurality of holes 57 are located near the forward end of each seal 55. Holes 61 are located on both sides of each seal 55, except the seals 55 that join the longitudinal frame members 27 on each side. The holes 57 in these seals 55 will be directed only laterally inward. The holes 57 in the seals 55 oppose each other across each of the sections 29. Air from blower 19 (FIG. 1) will discharge through holes 57 to urge the grain toward the centers of each of the sections 29.

Referring to FIGS. 6 and 7, each of the fingers 35 is preferably a plastic member having a neck 59 extending from each side. Each neck 59 fits within a square hole 60 extending laterally through each finger 35. Neck 59 has a cylindrical portion that extends through a circular hole 61 in each of the longitudinal section members 31. A finger linkage member 63 on one side of each sieve section 29 rigidly secures to the neck 59. Finger linkage member 63 is a bracket that has a square hole 65 that locates on a mating square portion of neck 59. Pivoting or rotating finger linkage member 63 will thus cause fingers 35 to pivot.

Each finger linkage member 63 extends upward and pivotally engages a finger drive member 67. Finger drive member 67 is a long strip that extends along the length of the longitudinal section member 31. A pivot pin 69 extends from each finger linkage member 63 into a circular hole provided in finger drive member 67.

Moving finger drive member 67 longitudinally relative to longitudinal section member 31 will pivot finger linkage member 63 to change the inclination of fingers 35 relative to the longitudinal section members 31.

A conventional mechanism (not shown) located at one end of sieve 17 will allow an operator to manually move finger drive member 67 and lock it in a selected position. Each sieve section 29 will require only one of the finger drive members 67.

In operation, the operator may adjust the inclination of fingers 35 (FIG. 5) prior to beginning to cut crop. This adjustment is handled by moving finger drive member 67 (FIGS. 6, 7) in a longitudinal direction. This movement causes finger linkage member 63 to rotate, pivoting simultaneously all of the fingers 35 contained within the same sieve section 29. The operator separately adjusts the fingers 35 of each sieve section 29.

Then the operator will begin cutting crop in a conventional manner. The crop will be transported up header 12 (FIG. 1) into threshing rotor 15. Threshed grain will fall onto the sieve 17. Blower 19 discharges air through sieve 17. Reciprocation of sieve 17 and air circulation causes chaff to separate from grain and be discharged from combine 11. The grain will fall through both sieves 17 into a collection area where it will be transported to bin 21.

If the combine 11 is cutting on ground that is level in a lateral direction, the combine 11 will not be leaning. The sieve 17 will appear as shown schematically in FIG. 3. All of the sieve sections 29 will be located in a single plane. This plane will be parallel with the sieve frame 23 (FIG. 2). If the combine begins cutting along a terrace or hill side and begins to lean transverse to its longitudinal axis, then inclinometer 43 (FIG. 2) will sense the leaning movement. Inclinometer signals motor 51 to move the sieve sections 29 so as to maintain them horizontal in a lateral direction.

The cable 49 will move the drive member 47 (FIG. 5), which in turn pivots the linkage member 41. Linkage member 41 simultaneously pivots the sieve sections 29 about the pivot pins 39. The amount of pivot is selected so as to maintain all of the sieve sections 29 level in a lateral direction. The pivoting is shown in FIG. 4. Each sieve section 29 will be parallel with all of the other sieve sections 29. The plane of each sieve section 29, however will be vertically spaced from the planes of the other sieve sections 29. This creates a stairstep configuration to sieve sections 29. The sieve longitudinal frame members 27 will be leaning with combine 11. Sieve sections 29, being generally horizontal, will not cause grain to pile up along one side.

When the combine 11 returns to a position in which it is not leaning to one side, the inclinometer 53 (FIG. 2) will signal motor 51 to return the sieve sections 29 back to the position shown in FIG. 3.

The invention has significant advantages. The sieve is maintained in a generally horizontal orientation while the combine leans to one side. This prevents a reduction in the efficiency of the sieve. By dividing the sieve into longitudinal sections, and pivoting each section separately, the space required to level the sieve is much less than prior art proposals which involve levelling the entire sieve frame rather than separate sections. The separate sections allow easy adjustment of the fingers simultaneously for different crops.

While the invention has been shown in only one of its forms, it should be apparent to those skilled in the art that it is not so limited, but is susceptible to various changes without departing from the scope of the invention.

I claim:

1. In a combine having a frame, a threshing drum carried rotatably by the frame for threshing grain, a sieve located below the threshing drum and driven in oscillation, and blower means for discharging air upward through the sieve to separate chaff from grain, the sieve comprising in combination:
    a pair of lateral frame members mounted for oscillation relative to the frame of the combine and spaced apart from each other along a longitudinal axis of the combine;
    a plurality of sections extending along the longitudinal axis between the lateral frame members, each of the sections having a rectangular frame having a pair of laterally spaced apart longitudinal section frame members connected at forward and rearward ends by lateral section frame members, respectively, each of the sections having a plurality of adjustable fingers located perpendicular to the longitudinal axis for directing chaff rearward and for allowing grain to fall through the sieve;
    a pivot rod stationarily mounted to each of the sections and rotatably carried by the one of the lateral frame members;
    controller means for sensing leaning of the combine transverse to the longitudinal axis and for simultaneously rotating the pivot rods in response thereto in order to maintain the sections level;
    a finger pivot member stationarily mounted to each of the fingers and extending rotatably through a hole provided in one of the longitudinal section frame members of each section; and
    adjusting means connected to each finger pivot member of the fingers contained in the same section for simultaneously pivoting the fingers to a selected inclination relative to the longitudinal section frame members.

2. The combine according to claim 1, further comprising:
    seal means extending longitudinally between each of the sections to prevent chaff from falling between the sections.

3. The combine according to claim 1, further comprising:
    seal means including an elastomeric seal extending longitudinally between each of the sections to prevent chaff from falling between the sections.

4. The combine according to claim 1, further comprising:
    seal means including an elastomeric seal extending longitudinally between each of the sections to prevent chaff from falling between the sections; and
    a plurality of holes extending through the seal for directing some of the air discharged by the blower means through the holes and laterally across the fingers.

5. The combine according to claim 1, wherein the controller means comprises:
    a motor;
    level means for sensing leaning of the combine and controlling the motor in response thereto; and
    linkage means mounted between the pivot rods and the motor for simultaneously rotating the pivot rods to tilt the sections relative to the lateral frame members.

6. The combine according to claim 1, wherein the controller means comprises:
    a motor;
    level means for sensing leaning of the combine and controlling the motor in response thereto;
    a drive member moveably mounted to one of the lateral frame members adjacent the pivot rods perpendicular to the longitudinal axis;
    a plurality of linkage members, each having one end mounted to one of the pivot rods, each having another end pivotally mounted to the drive member; and
    drive means mounted between the motor and the drive member for moving the drive member in response to the level means for rotating the pivot rods to tilt the sections relative to the lateral frame members.

7. The combine according to claim 1, further comprising:
    mounting means for mounting the fingers of each of the sections for simultaneous pivotal movement with the other fingers contained within the same section and relative to the longitudinal section frame members of the section.

8. The combine according to claim 1, wherein the finger pivot member comprises:
    a neck placed within a polygonal hole provided within each finger.

9. The combine according to claim 1, wherein the adjusting means comprises:
    a finger drive member mounted to one of the longitudinal section frame members of each section; and
    a finger linkage member having one end connected to each finger pivot member and another end pivotally engaged with the finger drive member.

10. A sieve for a combine, comprising in combination:
    a pair of lateral sieve frame members spaced apart from and parallel to each other along a longitudinal axis;
    a plurality of sections extending along the longitudinal axis, each of the sections having a rectangular frame having a pair of laterally spaced apart longitudinal section frame members connected at forward and rearward ends by lateral section frame members, respectively;
    a plurality of fingers mounted between and perpendicular to the longitudinal section frame members for directing chaff rearward and for allowing grain to fall through the sieve;
    seal means extending between the longitudinal section frame members of adjacent sections for preventing chaff from falling between the sections;
    a pivot rod stationarily mounted to one of the lateral section frame members and rotatably carried by one of the lateral sieve frame members;
    a motor;
    level mean for sensing leaning of the combine and controlling the motor in response thereto;
    a drive member movably mounted to one of the lateral sieve frame members adjacent the pivot rods;
    a plurality of linkage members, each having one end mounted to one of the pivot rods, each having another end pivotally mounted to the drive member;
    drive means mounted between the motor and the drive member for moving the drive member in response to the level means for rotating the pivot rods to tilt the sections relative to the lateral sieve frame members for maintaining the sections level while the combine is leaning;

a finger pivot member stationarily mounted to each of the fingers and extending rotatably through a hole provided in one of the longitudinal section frame members of each section;

a finger drive member mounted to one of the longitudinal section frame members of each section or longitudinal movement relative thereto; and a finger linkage member having one end connected to each finger pivot member and another end pivotally engaged with the finger drive member for simultaneously pivoting the fingers to a selected inclination relative to the longitudinal section frame members.

11. The sieve according to claim 10 wherein the seal means comprises an elastomeric seal having two parallel longitudinal edges, each of the edges being secured to one of the longitudinal section frame members of adjacent sections.

12. The sieve according to claim 10 wherein the seal means comprises:

an elastomeric seal having two parallel longitudinal edges, each of the edges being secured to one of the longitudinal section frame members of adjacent sections; and a plurality of holes extending through the seal at least partly along the length of the seal for discharging air blown by the combine from below the sieve.

13. The sieve according to claim 10, wherein the finger pivot member consists of:

a neck rigidly secured within a polygonal hole located in each finger.

* * * * *